G. B. CLARKE.
Combined Spittoon and Foot Warmer.
No. 47,280.
Patented April 18, 1865.
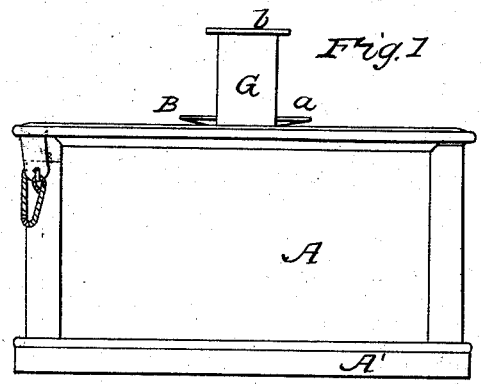
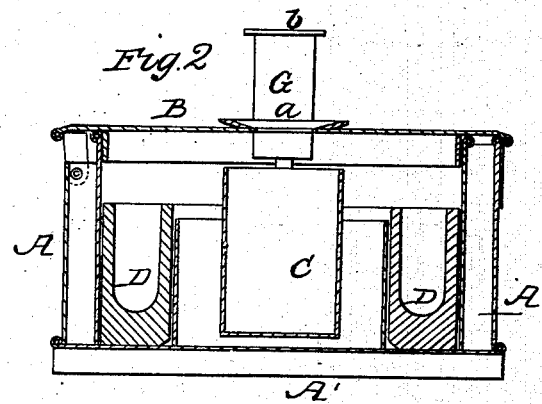
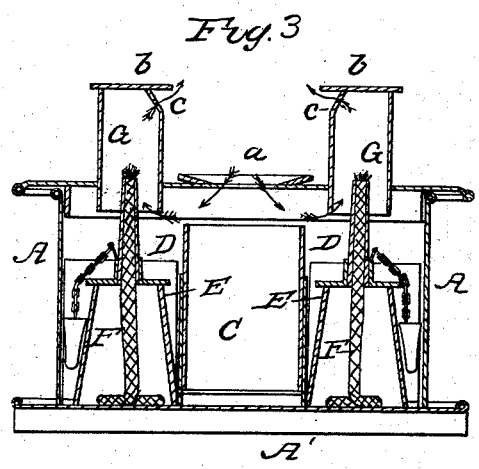
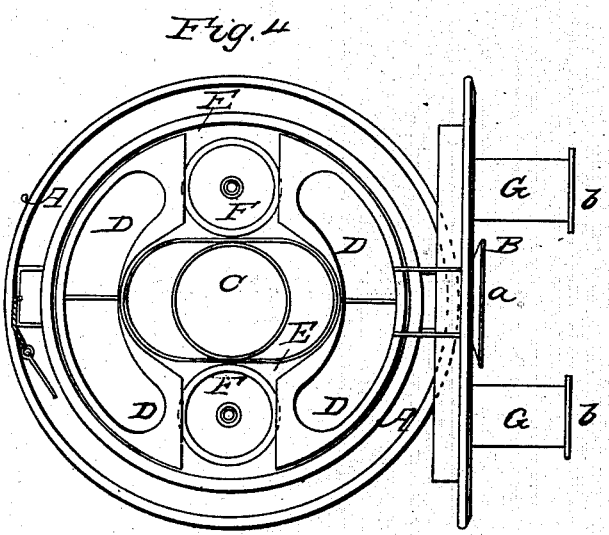

UNITED STATES PATENT OFFICE.

GEO. B. CLARKE, OF LEONARDSVILLE, NEW YORK.

COMBINED SPITTOON AND FOOT-WARMER.

Specification forming part of Letters Patent No. 47,280, dated April 18, 1865.

*To all whom it may concern:*

Be it known that I, GEORGE BABCOCK CLARKE, of Leonardsville, Madison county, State of New York, have invented a Combined Spittoon and Foot-Warmer; and I do hereby declare that the following is a full, clear, and exact description thereof, reference being had to the accompanying drawings, making a part of this specification, in which—

Figure 1 is a side elevation of a contrivance which is adapted to serve as a spittoon and foot-warmer. Fig. 2 is a diametrical section through Fig. 1. Fig. 3 is a diametrical section through Fig 1, taken at right angles to the section of Fig. 2. Fig. 4 is a top view of the spittoon and foot-warmer, with the cover thereof thrown up.

Similar letters of reference indicate corresponding parts in the several figures.

The object of my invention is to so contrive a spittoon that without interfering with its office as such it is also made to serve as a portable furnace for warming the feet, and thus form a novel and very useful article of manufacture.

To enable others skilled in the art to understand my invention, I will describe its construction and operation.

In the accompanying drawings, A represents a vessel, which may be made cylindrical, oblong, square, or of any other desired shape or size, and which may be made of any suitable material or combination of materials.

B is the cover of the vessel, with a central opening through it, surrounding which is a flaring receptacle, a, for receiving the expectoration and conducting it through the cover B into a vessel, C, which is located a short distance beneath said cover. This vessel C may be secured permanently in its place, or it may be so applied that it can be removed from vessel A and cleaned whenever desired. Surrounding the spit-box C is an annular space adapted for receiving the contrivances which are used for warming the vessel or the upper portion thereof.

D D represent removable iron vessels, which are of such shape as to adapt them to the annular chamber E, in which they are placed. These vessels are made quite thick, so that when heated they will retain their heat for a considerable time, and they may be heated and then introduced into the vessel A, to serve as "warming-irons," or they may be heated and kept hot within vessel A by introducing burning coals in them.

At the extremities of the iron chambers or vessels D D are spaces for receiving lamps F F, (shown in Figs. 3 and 4,) which may be constructed for burning any kind of oil, and which may be permanently or temporarily applied to the vessel A.

Directly above the burners of the lamps F F are chimneys G G, which are secured to the cover B of the vessel A, and project above the same, as shown in Figs. 1, 2, 3, and 4, so that when the cover is thrown back to expose the interior of the vessel A said chimneys are carried with it. The upper ends of these chimneys G G are closed by the caps b b, and openings c c are made through the sides of the chimneys, just beneath said caps, for the escape of heated air and for creating a draft through the central opening of the cover B, as indicated by the course of the arrows in Fig. 3, and thus supplying the flames of the lamps with oxygen to support combustion.

I have described several modes of warming the vessel A, either one or all of which may be used at one time.

In constructing my combined spittoon and furnace it will be desirable to provide for several modes of warming it, so that if one plan should be preferable to another it may be adopted.

When the device is to be used in carriages it will be proper to remove the lamps and use coal-fire in the metal vessels D D; but when the device is to be used in close apartments the lamps may be employed to keep up a steady heat at any desired temperature.

In order to prevent the heat of the vessel A from being communicated to the floor upon which the vessel may rest, a bottom, A', of some good non-conductor of heat, may be employed.

Having thus described my invention, what I claim as new, and desire to secure by Letters Patent, is—

A combined spittoon and foot warmer or furnace, constructed substantially as described.

GEO. B. CLARKE.

Witnesses:
LUKE HOXIE,
STEPHEN HOXIE.